Patented Nov. 4, 1941

2,261,492

UNITED STATES PATENT OFFICE 2,261,492

METHOD OF DECORATING CERAMIC ARTICLES

Thomas S. Bauman, Basil, Ohio

No Drawing. Application April 3, 1940,
Serial No. 327,633

7 Claims. (Cl. 41—26)

My invention relates to improvements in methods of decorating ceramic articles and more particularly is concerned with accelerating the drying of applied coloring material whereby to facilitate speeding up of multi-color decoration of tumblers, bottles, and like ceramic glass articles.

The invention may be said to be an improvement upon the invention disclosed in Soubier Patent #2,157,638 issued May 9, 1939, in that it is utilized in lieu of the drying device D illustrated in said patent.

This invention is specially adapted for use in conjunction with multi-color decoration of tumblers and bottles which operation involves individual application of the colors making up a given design. The coloring material generally consists of an enamel frit embodying an oily carrier which latter volatilizes during the step of fusing the coloring material with the article being decorated. Ordinarily a substantial interval of time must elapse between the successive application of the several individual colors in order to set the color and prevent smearing of the coloring material incident to contact with a screen preparatory to the application of the next succeeding color. Various types of drying devices have been tried out in the past and while successful in a degree, have almost invariably required too long a drying period.

An object of my invention is the substitution for the drying devices and methods heretofore employed, of a step that is so effective and rapid in its operation as to involve only a minimum interruption in the usual decorating operation.

In practicing my invention, the tumbler or bottle is subjected to the primary decorating operation in which one of a multi-color decoration is applied thereto. At this stage of the decorating operation it is understood that the applied color is wet and under ordinary conditions would have to be subjected to a prolonged period of heat treatment in order to remove the oily carrier and more or less finally set the coloring material. Otherwise smearing of the coloring material would result from contact between the article and screen. Following such heat treatment and consequent partial drying of the coloring material, the second or final color of the decoration would be applied and the article would then be carried through a conventional decorating leer.

Instead of subjecting the article to heat treatment for the purpose of volatilizing the oily carrier and partly setting the coloring material, I simply dust over the first applied color, a finely ground powdered or pulverized vegetable starch which may well be ordinary cornstarch. This material which is highly combustible with negligible ash or residue content, has proved to be an effective and comparatively inexpensive drying agent which completely absorbs all of the oily carrier and/or moisture in the coloring material. Any excess of the applied starch may be removed by a simple brushing operation. The number of applications of the drying agent will of course be determined entirely by the number of individual colors applied. Preferably the drying agent is applied to the completed design in order to facilitate final setting of the color and fusing of the frit with the tumbler, bottle or other article. During the customary fusing operation which takes place in a conventional decorating leer, the vegetable starch is completely consumed and therefore does not detrimentally affect the final decoration.

Modifications may be resorted to within the spirit and scope of the appended claims.

I claim:

1. In multi-color decoration of ceramic articles by a method in which liquid coloring materials of different colors are applied through a screen to the surface of the articles by successive operations, and finally fused with the articles, the step which consists in applying a powdered vegetable starch to the applied coloring material during the interval between successive applications of such materials.

2. In multi-color decoration of ceramic articles by a method in which liquid coloring materials of different colors are applied through a screen to the surface of the articles by successive operations, and firing the decoration, the step which consists in applying a powdered vegetable starch to the applied coloring material during the interval between successive applications of such material.

3. In multi-color decoration of ceramic articles by a method in which coloring materials of different color and each comprising an oily carrier and a powdered frit, are applied through a screen to the surface of the articles by successive operations and firing the material, the step which consists in applying a powdered vegetable starch to the applied materials during the interval between successive applications of such materials.

4. In multi-color decoration of ceramic articles by a method in which coloring materials of different color and each comprising an oily carrier and a powdered frit, are applied through a screen to the surface of the articles by successive operations and firing the material, the step which consists in applying a powdered vegetable starch to the applied materials between successive applications of such materials.

5. In multi-color decoration of ceramic articles by a method in which liquid coloring materials of different colors are applied through a screen to the surface of the articles by successive operations and firing the material, the step which consists in applying a powdered cornstarch to the applied coloring material during the interval between successive applications of such materials.

6. In multi-color decoration of ceramic articles by a method in which liquid coloring materials of different colors are applied through a screen to the surface of the articles by successive operations, and finally fused with the articles, the step which consists in applying a powdered vegetable starch to the colored surface after the application of each color.

7. In multi-color decoration of ceramic articles by a method in which liquid coloring materials of different colors are applied through a screen to the surface of the articles by successive operations, the steps which consist in applying a powdered vegetable starch to the colored surface after the application of each color, and firing the decorations whereby to permanently attach them to the articles and simultaneously therewith completely consume the starch.

THOMAS S. BAUMAN.